United States Patent
Series

(10) Patent No.: US 6,377,918 B1
(45) Date of Patent: Apr. 23, 2002

(54) SPEECH ANALYSIS USING MULTIPLE NOISE COMPENSATION

(75) Inventor: Robert W Series, Malvern (GB)

(73) Assignee: Qinetiq Limited, London (GB)

(*) Notice: Subject to any disclaimer, the term of this patent is extended or adjusted under 35 U.S.C. 154(b) by 0 days.

(21) Appl. No.: 09/355,847

(22) PCT Filed: Feb. 26, 1998

(86) PCT No.: PCT/GB98/00615

§ 371 Date: Aug. 5, 1999

§ 102(e) Date: Aug. 5, 1999

(87) PCT Pub. No.: WO98/43238

PCT Pub. Date: Oct. 1, 1998

(30) Foreign Application Priority Data

Mar. 25, 1997 (GB) .............................. 9706174
Jul. 9, 1997 (GB) .............................. 9714345

(51) Int. Cl.[7] ....................... G10L 21/02; G10L 15/20

(52) U.S. Cl. .................... 704/226; 704/233

(58) Field of Search .................. 704/226–228, 704/233, 220

(56) References Cited

U.S. PATENT DOCUMENTS 5,687,285 A * 11/1997 Katayanagi et al. ........ 704/226
5,875,423 A * 2/1999 Matsuoka .................... 704/220

OTHER PUBLICATIONS

Yong et al, "Speaker Normalization via a Linear Transformation on a Perceptual Feature Space and its Benefits in ASR Adaptation", EUROSPEECH 89 proceedings, vol. 1, Sep. 1989, pp. 258–261.

ZHAO, "Iterative Self–Learning Speaker and Channel Adaptation Under Various Initial Conditions", ICASSP Proceedings, May 1995, pp. 712–715.

Zhao, "Self–learning Speaker and Channel Adaptation Based On Spectral Variation Source Decomposition", SPEECH COMMUNICATION vol. 18, No. 1, Jan. 1996, pp. 65–77.

* cited by examiner

*Primary Examiner*—David D. Knepper
(74) *Attorney, Agent, or Firm*—Nixon & Vanderhye P.C.

(57) ABSTRACT

A speech analysis system 10 incorporates a filterbank analyser 18 producing successive frequency data vectors for a speech signal from two speakers. From each data vector, units 22A and 22B produce a set of modified data vectors compensated for differing forms of distortion associated with respective speakers. A computer 24 matches modified data vectors to hidden Markov model states. It identifies the modified data vector in each set exhibiting greatest matching probability, the model state matched therewith, the form of distortion with which it is associated and the model class, ie speech or noise. The matched model state has a mean value providing an estimate of its associated data vector. The estimate is compared with its associated data vector, and their difference is averaged with others associated with a like form of distortion in an infinite impulse response filter bank 48A or 48B to provide compensation for that form of distortion. Averaged difference vectors provide compensation for multiple forms of distortion associated with respective speakers.

15 Claims, 2 Drawing Sheets

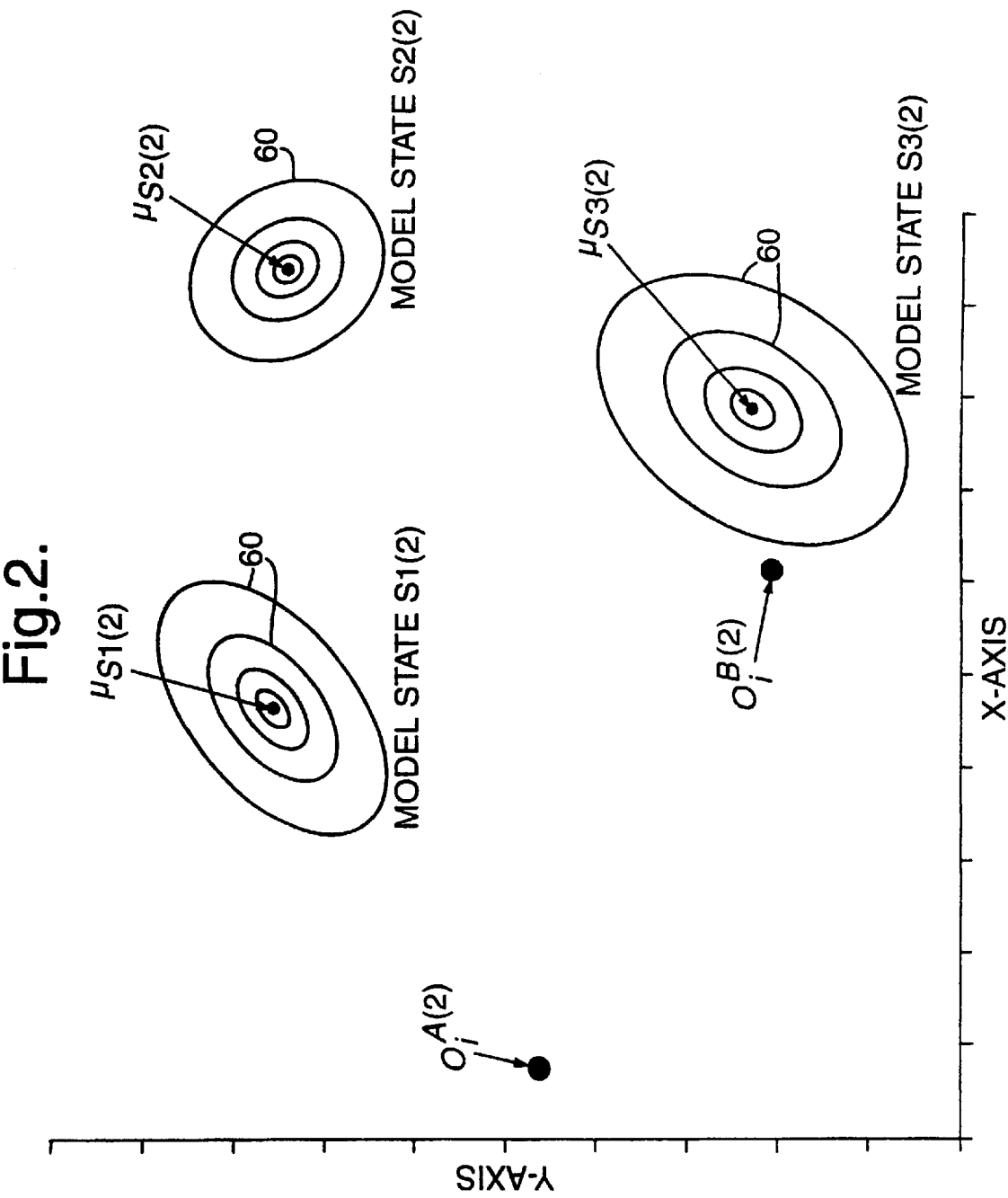

SPEECH ANALYSIS USING MULTIPLE NOISE COMPENSATION

Figure 1:
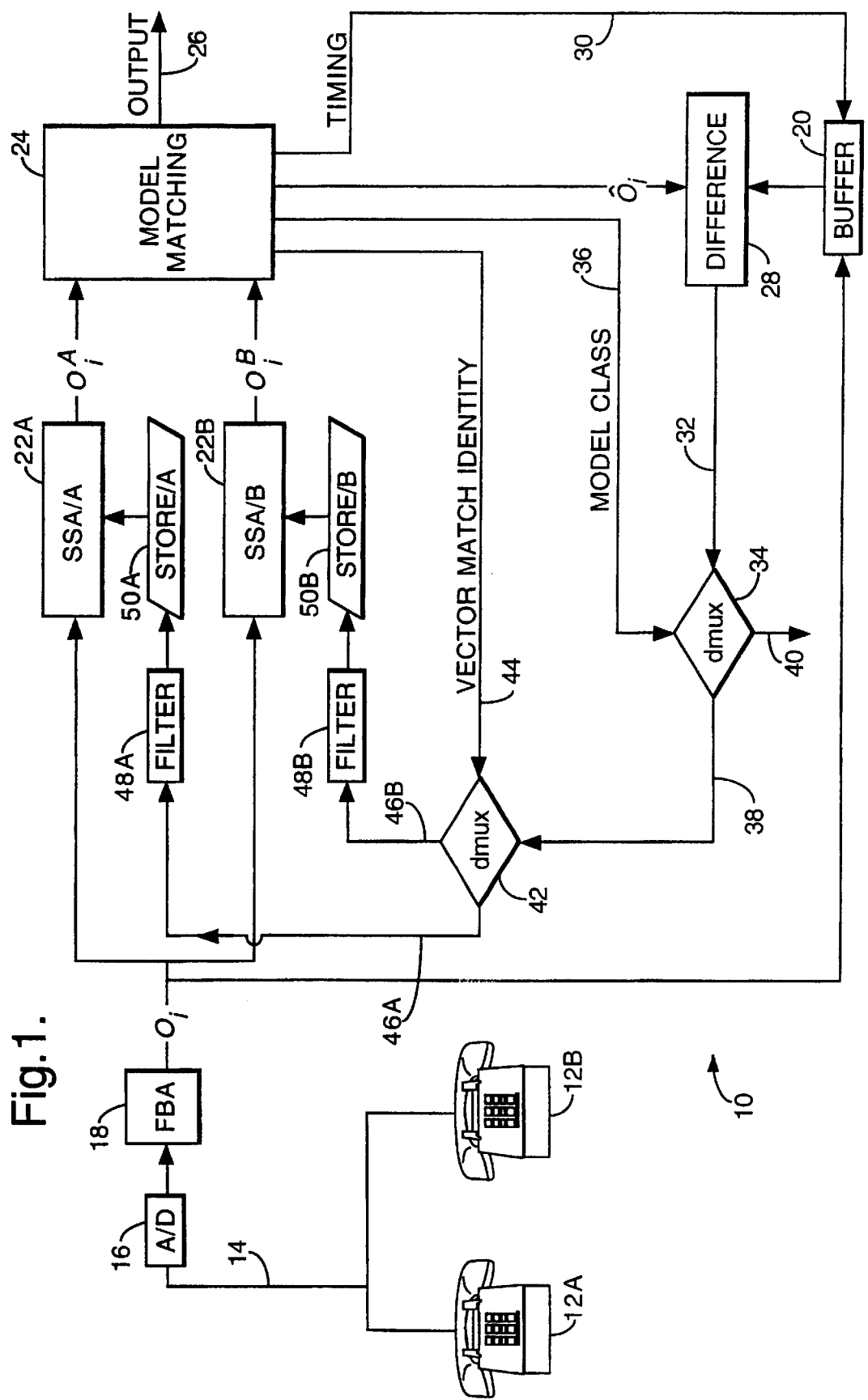

This invention relates to a speech analysis system for processing speech which is subject to different forms of distortion. It is particularly (although not exclusively) relevant to recognition of words, languages or speakers in two way telephone conversations.

The problem to which the invention is addressed may be illustrated in one aspect by automatic speech recognition technology as used in telephone systems. Here the system's performance is often severely degraded by changes in a speech signal due to the position of the telephone handset or by the characteristics of the handset, telephone line and exchange. Attempts may be made to compensate for the problem by using some form of automatic gain control (AGC). Unfortunately this may be difficult to implement. For example, in two way telephone conversations in which the apparatus is connected using a two wire configuration, there are often substantial differences between the intensity levels of the speech signals of the persons speaking to one another. Using more sophisticated technology it is possible to intercept a call at a local exchange and to obtain separate signals from each telephone instrument. While this offers some improvement it does not address the difficult problem of reverse channel echo, which arises from contamination of the speech of one party to the conversation with that of the other.

The problem is not limited to differences in speech level. Many speech recognition systems attempt to adapt in some manner to the characteristics of the individual speaker or microphone. If speaker characteristics change frequently, compensation becomes very difficult.

Various methods are known for improving recognition performance by compensating for distortion or speaker characteristics. Current speech recognition systems convert the input signal from a waveform in the time domain into successive vectors in the frequency domain during a process sometimes known as "filterbank analysis". These vectors are then matched to models of the speech signal. In some systems the vectors undergo a transformation prior to matching to speech models. It is possible to counteract signal distortion and speaker effects by applying some form of compensation to the vectors before transformation and matching. There are a number of known methods for determining the appropriate compensation. One such method is disclosed by Sadaoki Furui, "Cepstral Analysis Technique for Automatic Speaker Verification", IEEE Trans Acoustics, Speech and Signal processing, 29(2):254–272, April 1981. It involves averaging data obtained by filterbank analysis over an entire conversation to obtain the long term spectral characteristics of a signal and applying a compensation for distortions during a second pass over the data. The compensated data is then passed to a speech recognition device for matching to speech models.

There are two main problems with this approach when applied to multi-speaker speech signals or single speaker speech signals where the form of distortion changes. First, since a single correction is applied for the entire conversation it is poorly suited to conversations in which the speaker characteristics change frequently. This may happen during telephone conversations or other dialogues. Secondly, it is necessary to process the entire conversation to obtain the appropriate correction before recognition commences, which makes it unsuitable for real time applications.

A preferable approach is to use a technique sometimes known as spectral shape adaptation (SSA). A recognition system using this technique provides information on the expected spectral characteristics of the signal to be recognised at each time instant, and this is compared to the equivalent actually present in that signal to provide a difference term. The difference term is then averaged over a number of successive signals (time averaging) to provide a correction term.

A system of this kind has been described by Yunxin Zhao, "Iterative Self-Learning Speaker and Channel Adaptation under Various Initial Conditions", Proc IEEE ICASSP [11] pages 712–715. Here data is processed on a sentence by sentence basis. An input signal undergoes filterbank analysis to create successive vectors each indicating the variation in signal energy over a number of frequency bands. The vectors are processed by matching to speech model states. The parameters of the model state to which a vector has been matched are used to predict a value for that vector which would be expected according to the model. The difference between the vector and the predicted value is computed and time averaged with difference values obtained for earlier vectors from the sentence to determine the average distortion suffered by each sentence. The SSA parameters determined for one sentence are then used to process the next sentence.

Zhao's approach is unfortunately not appropriate where there are two or more speakers or forms of distortion because it can result in SSA parameters derived from speech of one speaker or subject to a particular form of distortion being applied in connection with a different speaker or form of distortion.

It is an object of the invention to provide a speech analysis system arranged to counteract multiple forms of distortion.

The present invention provides a speech analysis system for processing speech which has undergone distortion, and including compensating means for modifying data vectors obtained from speech to compensate for distortion, matching means for matching modified data vectors to models, and deriving means for deriving distortion compensation from data vectors for use by the compensating means; characterised in that:

a) the compensating means is arranged to compensate for a plurality of forms of distortion by modifying each data vector with a plurality of compensations to provide a respective set of modified data vectors compensated for respective forms of distortion, b) the matching means is arranged to indicate the modified data vector in each set exhibiting the greatest matching probability and the form of distortion for which it has been compensated, and c) the deriving means is arranged to derive compensation on the basis of the modified data vector in each set exhibiting greatest matching probability for use by the compensating means in compensating for the form of distortion for which that modified data vector was compensated.

The invention provides the advantage that compensation differentiates between forms of distortion so that the likelihood of correct speech analysis is improved.

The invention may be arranged to analyse speech from a plurality of speech sources each associated with a respective form of distortion, and wherein:

a) the compensating means is arranged to provide modified data vectors in each set compensated for distortion associated with respective speech sources, b) the matching means is arranged to implement models divided into classes associated with speech and non-speech, and to indicate the model class associated with the modified data vector in each set exhibiting the greatest matching probability, and c) the deriving means is arranged to derive a compensation from modified data vectors associated with speech class models.

The system of the invention may be arranged to update non-speech models within the matching means. The matching means may be arranged to identify the modified data vector in each set exhibiting the greatest matching probability taking into account earlier matching and speech recognition constraints, in order to assess matching probability over a sequence of data vectors.

The deriving means may be arranged to derive a compensation by averaging over a contribution from the modified data vector in each set exhibiting the greatest matching probability and the model with which it is matched and preceding contributions of like kind. Averaging may be carried out with by infinite impulse response filtering means.

The matching means may be arranged to implement hidden Markov model matching based on speech models with states having matching probability distributions and associated estimation values for vectors matching therewith; the estimation values may be mean values of respective probability distributions; the deriving means may be arranged to employ estimation values to derive compensation. Each model may have one or more states.

The deriving means and the compensating means may be arranged in combination to avoid implementing compensation not associated with a speech source. The matching means may employ models in different classes associated with respective types of acoustic data source, such as speech and noise sources, and may indicate that compensation is not to be derived in response to matching to a noise source. It may be arranged to adapt speech models to increase conformity with data vectors.

In one embodiment, the system of the invention includes means for generating data vectors having elements representing logarithmically expressed averages over respective frequency intervals, and wherein:

a) the compensating means is arranged to provide a set of modified data vectors by adding to each data vector a set of compensation vectors associated with respective forms of distortion, and b) the deriving means is arranged to derive an updated compensation vector from a first contribution from the modified data vector in each set exhibiting the greatest matching probability and an estimation vector from the model with which it is matched, together with earlier like contributions associated with the same model class.

The invention may include a respective channel for transfer of each modified data vector to the matching means.

In another aspect, the invention provides a method for analysing speech which has undergone distortion including the steps of:

a) modifying speech data vectors to compensate for distortion, b) matching modified data vectors to models, and c) deriving and applying distortion compensation, characterised in that:

i) step (a) comprises applying a plurality of compensations to each data vector to provide a respective set of modified data vectors compensated for respective forms of distortion, ii) step (b) comprises identifying the modified data vector in each set exhibiting the greatest matching probability and the form of distortion for which it was compensated, and iii) step (c) includes deriving a compensation from the modified data vector in each set exhibiting the greatest matching probability for use in compensating for the form of distortion for which that vector was compensated.

The system of the invention may be employed for speech recognition, or alternatively for other analysis purposes such as language identification, recognition or assessment of a speaker's age, gender or other attributes. It may be used to detect which of a variety of speakers is talking at a given instant.

In order that the invention might be more fully understood, embodiments thereof will now be described, by way of example only, with reference to the accompany drawings, in which:

FIG. 1 is a block diagram of a speech analysis system of the invention; and

FIG. 2 graphically illustrates speech model states employed in the system of FIG. 1;

Referring to FIG. 1, a speech analysis system of the invention is indicated generally by 10. The system 10 incorporates two telephones 12A and 12B multiplexed together by connection to a line 14. The line 14 is connected to an analogue to digital (A/D) converter 16, which is itself connected to a filterbank analyser 18. The analyser 18 implements a four hundred point discrete Fourier transform (DFT) using a 20 mS Hamming window to deal with the usual problem of non-infinite signal samples. It combines the Fourier components so obtained into twenty-six subsets over which average values are obtained for each of twenty-six frequency intervals or bins on an approximately mel (ie perceptually linear) scale, and produces logarithmic amplitude values. It therefore simulates a bank of bandpass filters with logarithmic outputs in twenty-six channels. Output from the analyser 18 passes to a buffer memory 20 and to a parallel arrangement of first and second compensation units 22A and 22B each providing spectral shape adaptation (SSA). The SSA compensation units 22A and 22B are digital adders. They are connected to a model matching computer 24 providing a system output at 26.

The matching computer 24 is also connected to a difference calculator 28; this calculator receives a second input from the buffer memory 20, which itself receives timing information from the matching computer 24 via a line 30. Output from the difference calculator 28 passes via a line 32 as a first input to a first demultiplexer 34, which receives a second input of a model class indication from the matching computer 24 via a line 36. The demultiplexer 34 has two outputs 38 and 40, of which the first output 38 is connected to a second demultiplexer 42 and the second output 40 is unconnected. The second demultiplexer 42 receives a second input of matched model identity from the computer 24 via a line 44. It has first and second outputs 46A and 46B. The first output 46A is connected to a first filter bank 48A in series with a first SSA parameter store 50A and the first compensation unit 22A. Similarly, the second output 46B is connected to a second filter bank 48B in series with a second SSA parameter store 50B and the second compensation unit 22B. Each of the filter banks 48A and 48B is an array of twenty-six infinite impulse response (IIR) filters.

The recognition system 10 operates as follows. When two speakers are conversing by means of the two telephones 12A and 12B, an analogue speech signal is present on the line 14. This signal is digitised by the A/D converter 16, which samples the signal and provides digital output signals at the rate of 20 KHz each accompanied by a time frame number i indicating the time $t_i$ at which it was sampled. At any instant, the signal may have originated from one or the other or both of the telephones 12A and 12B, or it may consist of noise in an interval between speech signals. Digitised signals pass from the converter 16 to the filterbank analyser 18, where they are used in calculating successive four hundred point discrete Fourier transforms (DFT). Each DFT is a set of four hundred points, and each point represents a spectral amplitude at a respective frequency of the four hundred frequencies for which the DFT is calculated. Each set of points is "binned" or separated into twenty-six sub-groups, added to provide a sum for each sub-group, and the logarithm of each sum is taken to provide average energies on a logarithmic scale for twenty-six frequency intervals. The analyser 18 is the digital equivalent of a bank of twenty-six analogue bandpass filters. Each output transform from the analyser 18 is a vector having twenty-six components, and each component represents the logarithm of the energy in a respective frequency interval obtained by averaging over associated Fourier transform coefficients.

Individual data vectors are output from the analyser 18 in succession every 10 mS. The $i^{th}$ data vector output from the analyser 18 at time $t_i$ is defined as $O_i$. As has been said, it may have originated from one or the other of the telephones 12A or 12B, or from a combination of both, or from noise. The data vectors are passed to the buffer memory 20, which stores the five hundred most recently obtained vectors each at a respective address number corresponding to its time of production $t_i$. The address numbers are the time frame numbers i expressed in modulo 500, ie address 500+i= address i, so that the oldest entry in the buffer memory 20 becomes overwritten by the latest entry when the time frame number exceeds 500.

Each data vector $O_i$ is also passed to both compensation units 22A and 22B, which apply a transformation using respective sets of twenty-six parameters $p_{Aj}$ and $p_{Bj}$ (j=0 to 25) stored in logarithmic form in respective parameter stores 50A and 50B. The production of these parameters will be explained later. The compensation units 22A and 22B add the contents of respective stores 50A and 50B to the current vector data $O_i$ to produce respective compensated data vectors $O_i^A$ and $O_i^B$. This addition is of logarithmic quantities, and corresponds to formation of a scalar product of two vectors. Compensation units 22A and 22B and their respective parameter stores 50A and 50B define two separate channels for passing modified data vectors associated with different data sources (telephones 12A and 12B) to the matching computer 24. It is also possible to use a single channel in which modified data vectors associated with different data sources are multiplexed for later separation in the computer 24. Each set of parameters $p_{Aj}$ or $p_{Bj}$ in a store 50A or 50B corresponds to the current estimate of the compensation appropriate to counteract the distortion associated with the speech signal from a respective telephone 12A or 12B. The two stores 50A and 50B normally contain different parameter sets, and the compensated vectors $O_i^A$ and $O_i^B$ therefore generally differ despite being derived from the same filterbank output.

After compensation, both compensated data vectors $O_i^A$ and $O_i^B$ are passed to the model matching computer 24 together with their time frame number i. The computer 24 implements a procedure to be described with reference to FIG. 2, which (to permit illustration) shows a much simpler model space of two dimensions (as opposed to twenty-six in the present example). The model matching computer 24 implements a conventional hidden Markov model matching algorithm of the kind well known in the prior art. See for example the standard text on speech recognition, "Speech Synthesis and Recognition", J N Holmes, Van Nostrand Reinhold (UK) 1988, Chapters 7 and 8 in particular. The computer 24 employs models which are conventional hidden Markov models (HMM) of telephone speech. Each model corresponds to a word or part of a word (sub-word); each model has a number of states and corresponds to a sequence of sounds. For example, in a digit recogniser for the numbers 0 to 9, ten states per model may be used. A state is represented by a single component gaussian probability distribution having the same dimensionality as that of the model space; ie the distribution has the form:

$$C_s \exp(-((x_0-\mu_{s,0})/2\sigma_{s,0})^2 \ldots -((x_k-\mu_{s,k})/2_{s,k})^2 \ldots ((x_{25}-\mu_{s,25})/2\sigma_{s,25})^2) \quad (2)$$

where $C_S$ is a constant for the model state, $\mu_{s,k}$ and $bx;1\sigma_{S,k}$ (k=0 ... 25) are the twenty-six components of the mean and standard deviation of the probability distribution for model state S in a twenty-six dimensional model space, and $x_k$ are variables defining that space. Each model state is also associated with a class which may be either speech or non-speech according to whether the model is a model for a human speech sound or for noise originating from some other source (eg doors slamming, noises introduced by telephone apparatus etc).

FIG. 2 is a two-dimensional illustration in which features equivalent to earlier twenty-six-dimensional elements are indicated by "(2)" suffixes. It shows three two-dimensional model states, S1(2), S2(2) and S3(2), each of which is a probability distribution represented by contour lines such as 60; the model states have most probable or estimation values $\mu_{S1(2)}$, $\mu_{S2(2)}$ and $\mu_{S3(2)}$ respectively, each of which is the peak value of the associated distribution defined by its set of contours. Also shown are $O_i^{A(2)}$ and $O_i^{B(2)}$, two dimensional equivalents of the twenty-six dimensional compensated data vectors $O_i^A$ and $O_i^B$. The probability of a match between a compensated data vector and a model state is indicated by the magnitude of the probability distribution of the model state at the position of the vector subject to any constraints imposed by earlier matching history. This probability is a maximum when a compensated data vector coincides with the peak value of a model state, unless constraints dictate otherwise. In the simplified two dimensional situation shown in FIG. 2, probability considerations may indicate that a data vector $O_i^{A(2)}$ should be matched to model state S1(2) and vector $O_i^{B(2)}$ should be matched to model state S3(2), if this is not contra-indicated by matching of earlier vectors $O_{i-m}^{A(2)}$, where m=1, 2, . . . .

A comparison is then made between the quality of these two matches; ie, indicating twenty-six dimensional quantities by absence of "(2)" suffixes once more, is the match between $O_i^A$ and S1 better or worse than that between $O_i^B$ and S3? In other words, is the magnitude of the probability distribution of the model state S1 at the position of $O_i^A$ greater than that of the model state S3 at the position of $O_i^B$ subject to any constraints imposed by earlier matching history. Only the better of the two matches is accepted, which will be taken to be the latter (ie S3) in the following discussion. (In a prior art HMM based recognition system only one compensated data vector would be processed for any individual data vector $O_i$ produced by the analyser 18, and so no comparison of the quality of the best matches would be made).

Once the computer 24 has identified which of vectors $O_i^A$ or $O_i^B$ provides a best match to a model state, it computes an estimation vector $\hat{O}_i$, this being the highest probability value of that model state. For single component gaussian models the vector $\hat{O}_i$ is equal to the mean value of the matched model state.

The computer 24 outputs the following information:

a) the identity of the best matched model state (S3 in this example), which is output at 26;

b) the 26 dimensional vector $\hat{O}_i$ ($\mu_{S3}$ in this example for the model state S3), which is the estimation value according to the matched model; ie it corresponds to that data vector having the highest probability of being a match to the matched model state; it is passed to the difference calculator 26;

c) the address of the $i^{th}$ data vector $O_i$ stored in the buffer memory 20 (ie the time frame number i expressed in modulo 500);

d) the class of the best matched model state, i.e. non-speech or speech; a digital 0 or 1 is output to indicate respectively that the computer 24 has matched to non-speech or speech, and this is received by the first demultiplexer 34; and e) the identity of the best matched vector, ie an indication of data vector distortion; when the computer 24 matches to speech, it outputs a digital 0 or 1 to indicate respectively that the better match is to compensated vector $O_i^A$ or to compensated vector $O_i^B$, which in turn indicates the system has deduced that the vector distortion is associated with telephone A or telephone B respectively; this indication is received by the second demultiplexer 42.

The vector $\hat{O}_i$ is passed to the difference calculator 28. At the same time, the buffer memory 20 receives from the computer 24 the memory address of the data vector $O_i$ from which the compensated vectors $O_i^A$ and $O_i^B$ were derived. In response to this address it outputs $O_i$ to the difference calculator 28 for comparison with $\hat{O}_i$. The difference calculator 28 computes the difference between these model and data vectors to generate a difference vector $D_i$, which represents an instantaneous estimate of the distortion process which the speech signal has undergone at time $t_i$.

The difference vector $D_i$ is passed to the first demultiplexer 34, which at the same time receives an indication of model class in the form of a digital 1 or 0; of these digits, 1 indicates that the model matching computer 24 has recognised a speech signal and 0 that it has recognised a non-speech signal, ie silence or noise. If the model class digit is 1, the first demultiplexer 28 routes the difference vector $D_i$ from the calculator 28 to the second demultiplexer 42. If it is 0, the difference vector $D_i$ appears at the second demultiplexer output 40, which is unconnected. It provides for information corresponding to non-speech signals (which is unwanted in this example) to be removed from the distortion correction process. Such information could of course be used for other purposes if required, as will be described later.

The second demultiplexer 42 receives an input digit 0 or 1 indicating the identity of the source of the signal which is associated with the model vector; the digits 0 and 1 indicate matching to compensated data vectors $O_i^A$ and $O_i^B$ respectively. On receipt of digit 0, the second demultiplexer 42 routes the difference vector $D_i$ to the first filter bank 48A; in response to digit 1, the difference vector $D_i$ is routed to the second filter bank 48B.

Each of the filter banks 48A and 48B is an array of twenty-six infinite impulse response filters. The difference vector $D_i$ is derived in response to a single data vector $O_i$, and it represents an instantaneous estimate of the correctable distortion at time $t_i$ due to microphone and line characteristics combined with differences due to the random nature of speech-like sounds. The first demultiplexer 34 provides for difference vectors computed from non-speech sounds to be removed from the correction process before they reach the filter banks 48A and 48B, and the second demultiplexer 42 routes each difference vector to a filter bank 48A and 48B associated with the telephone 12A or 12B to which the relevant identified model vector corresponds.

The filter banks 48A and 48B have like time constants of 0.5 seconds. They provide short term averaging over several words (eg about three words or 1.5 seconds). This counteracts the effects of random variations and errors of word recognition or simultaneous speech into both telephones 12A and 12B while tracking longer term variations due to correctable distortions. In response to receipt of each input difference vector $D_i$, an output compensation vector $C_i$ is produced which is an average over $D_i$ and contributions from earlier difference vectors diminishing exponentially with time; the contributions to the compensation vector $C_i$ arise predominantly from the most recent fifty difference vectors $D_{-49}$ to $D_i$.

Compensation vectors output from the first filter bank 48A pass to the first parameter store 50A and those from the second filter bank 48B are passed to the second parameter store 50B, replacing the existing contents in each case to provide updating. The elements of each compensation vector provide the set of parameters which are added to data vectors in one or other of the SSA compensation units 22A and 22B to provide spectral shape adaptation. Each of the parameters stores 50A and 50B maintains its contents until they are updated in response to identification of a speech signal from the respective telephone 12A or 12B.

There is a short delay in producing the match. In one embodiment of the invention in which elements 18 to 50B were implemented collectively by a computer, the time interval required to obtain updated parameters from the speech signal was 0.5 seconds, or about the duration of an average word. In consequence, it compensates for distortions whose effects vary from word to word. Typical prior art systems are much slower to provide compensation than this, and cannot cope with relatively short term distortion. The Zhao reference previously mentioned requires a whole sentence for analysis. In the present example, the transformation employed provides compensation for changes to the mean signal level and linear distortions introduced by signal channel or microphone characteristics.

The invention may be adapted to accommodate applications such as conference calls, where there are more than two telephones or speakers. This would involve the system 10 being extended by additional units equivalent to 22A, 48A and 50A and increasing demultiplexer capacity. A three way conference call would require three compensation units, 22A, 22B and 22C, three parameter stores 50A, 50B and 50C and three filters 48A, 48B and 48C. Each of the compensation units 22A to 22C would pass its output to the model matching computer 24, which would be reprogrammed to decide which of three compensated vectors $O_i^A$, $O_i^B$ and $O_i^C$ best matches one of the model states. Output 44 from the computer 24 would be one of three levels, 0, 1 or 2 and demultiplexing apparatus would be used to select one of three outputs 46A, 46B or 46C accordingly.

The invention may incorporate provision for adaptation for non-speech noise originating (or picked up by) telephone 12A or 12B. In this case the matching computer 24 includes two model states for tracking background noise. These model states are associated with noise from telephones 12A and 12B respectively. They have parameters which are adapted according to estimated current noise as follows. Non-speech (ie noise) difference vectors output from the demultiplexer 34 are used by the computer 24 to estimate background noise levels for telephones 12A and 12B. The computer 24 differentiates between noise originating in telephone 12A and telephone 12B. From the non-speech difference vectors, the computer 24 calculates changes to the parameters of its non-speech models for respective telephones 12A and 12B. The current estimate of the noise for each telephone produced in this way is averaged with 50 previous estimates for that telephone to provide insensitivity to matching errors arising from the algorithms implemented by the computer 24.

What is claimed is:

1. A speech analysis system for analysing speech which has undergone distortion, and including compensating means (22A, 22B) for modifying data vectors obtained from speech to compensate for distortion, matching means (24) for matching modified data vectors to models, and deriving means (28) for deriving distortion compensation from data vectors for use by the compensating means (22A, 22B), characterised in that:
   a) the compensating means (22A, 22B) is arranged to compensate for a plurality of forms of distortion by modifying each data vector with a plurality of compensations to provide a respective set of modified data vectors compensated for respective forms of distortion,
   b) the matching means (24) is arranged to indicate the modified data vector in each set exhibiting the greatest matching probability and the form of distortion for which it has been compensated, and
   c) the deriving means (28) is arranged to derive compensation on the basis of the modified data vector in each set exhibiting greatest matching probability for use by the compensating means (22A, 22B) in compensating for the form of distortion for which that modified data vector was compensated.

2. A system according to claim 1 characterised in that it is arranged to analyse speech from a plurality of speech sources each associated with a respective form of distortion, and wherein:
   a) the compensating means (22A, 22B) is arranged to provide modified data vectors in each set compensated for distortion associated with respective speech sources,
   b) the matching means (24) is arranged to implement models divided into classes associated with speech and non-speech, and to indicate the model class associated with the modified data vector in each set exhibiting the greatest matching probability, and
   c) the deriving means (28) is arranged to derive a compensation from modified data vectors associated with speech class models.

3. A system according to claim 2 characterised in that it is arranged to update non-speech models within the matching means.

4. A system according to claim 1 characterised in that it is arranged to recognise speech from a plurality of speech sources each associated with a respective form of distortion.

5. A system according to claim 1 characterised in that it is arranged to distinguish speech from noise and to omit noise data from implementation of compensation.

6. A system according to claim 1 characterised in that the matching means (24) is arranged to identify the modified data vector in each set exhibiting the greatest matching probability taking into account earlier matching, in order to assess matching probability over a sequence of data vectors.

7. A system according to claim 1 characterised in that the deriving means (28) is arranged to derive a compensation by averaging over a contribution from the modified data vector in each set exhibiting the greatest matching probability and the model with which it is matched and one or more preceding contributions of like kind.

8. A system according to claim 1 characterised in that the data vectors are representations of a speech signal as a function of frequency.

9. A system according to claim 1 characterised in that the matching means (24) is arranged to implement hidden Markov model matching and the deriving means (28 is arranged to produce compensations with the aid of maximum values of probability distributions of model states.

10. A system according to claim 1 characterised in that it includes means (18) for generating data vectors having elements representing averages over respective frequency intervals, and wherein:
   a) the compensating means (22A, 22B) is arranged to provide a set of modified data vectors by forming scalar products of each data vector with each of a set of compensation vectors associated with respective forms of distortion, and
   b) the deriving means (28) is arranged to derive an updated compensation vector from a first contribution from the modified data vector in each set exhibiting the greatest matching probability and an estimation vector from the model with which it is matched, together with one or more earlier like contributions associated with the same form of distortion.

11. A system according to claim 10 characterised in that each form of distortion is associated with a respective channel for transfer of modified data vectors compensated for that form of distortion to the matching means.

12. A system according to claim 1 characterised in that it is arranged to avoid implementing compensation not associated with speech.

13. A system according to claim 12 characterised in that the matching means (24) employs models in classes associated respectively with speech and noise, and is arranged to indicate the class of the model with which the modified data vector in each set exhibits the greatest matching probability, and the deriving means (28) and the compensating means (22A, 22B) are arranged in combination to avoid implementing compensations associated with a noise model class.

14. A method for analysing speech which has undergone distortion including the steps of:
   a) modifying speech data vectors to compensate for distortion,
   b) matching modified data vectors to models, and
   c) deriving and applying distortion compensation, characterised in that:
      i) step (a) comprises applying a plurality of compensations to each data vector to provide a respective set of modified data vectors compensated for respective forms of distortion,
      ii) step (b) comprises identifying the modified data vector in each set exhibiting the greatest matching probability and the form of distortion for which it was compensated, and
      iii) step (c) includes deriving a compensation from the modified data vector in each set exhibiting the greatest matching probability for use in compensating for the form of distortion for which that vector was compensated.

15. A method for analysing speech according to claim 14 characterised in that the forms of distortion are associated with a plurality of speech sources and noise.

* * * * *